(12) United States Patent
Caspi et al.

(10) Patent No.: US 7,581,605 B2
(45) Date of Patent: Sep. 1, 2009

(54) QUAD TRACKED VEHICLE

(75) Inventors: Yuval Caspi, Granada Hills, CA (US); Stephen Kong, Tuen Mun (HK)

(73) Assignee: MGA Entertainment, Inc., Van Nuys, CA (US)

(*) Notice: Subject to any disclaimer, the term of this patent is extended or adjusted under 35 U.S.C. 154(b) by 265 days.

(21) Appl. No.: 11/360,458

(22) Filed: Feb. 22, 2006

(65) Prior Publication Data

US 2007/0194540 A1 Aug. 23, 2007

(51) Int. Cl.
*B62D 55/075* (2006.01)
(52) U.S. Cl. .................. 180/9.1; 180/8.2; 180/8.1; 180/8.3; 180/93; 180/9.62
(58) Field of Classification Search ............. 180/9.1, 180/8.2, 8.1, 8.3, 93, 9.62
See application file for complete search history.

(56) References Cited

U.S. PATENT DOCUMENTS

| | | | |
|---|---|---|---|
| 3,166,138 A | 1/1965 | Dunn | |
| 3,417,832 A | 12/1968 | Ziccardi | |
| 3,869,011 A | 3/1975 | Jensen | |
| 4,709,773 A | 12/1987 | Clement et al. | |
| 4,727,949 A | 3/1988 | Rea et al. | |
| 4,909,341 A | 3/1990 | Rippingale et al. | |
| 4,932,831 A | 6/1990 | White et al. | |
| 4,977,971 A * | 12/1990 | Crane et al. | 180/8.3 |
| 5,337,846 A * | 8/1994 | Ogaki et al. | 180/8.2 |
| 5,517,416 A | 5/1996 | Torii et al. | |
| 6,132,287 A | 10/2000 | Kuralt et al. | |
| 6,267,196 B1 | 7/2001 | Wilcox et al. | |
| 6,523,629 B1 | 2/2003 | Buttz et al. | |
| 6,668,951 B2 * | 12/2003 | Won | 180/9.1 |
| 6,774,597 B1 | 8/2004 | Borenstein | |
| 6,837,318 B1 | 1/2005 | Craig et al. | |

(Continued)

FOREIGN PATENT DOCUMENTS

JP 63203483 8/1988

(Continued)

OTHER PUBLICATIONS

Chaos an Intelligent Ultra-Mobile SUGV: Combining the Mobility of Wheels, Tracks, and Legs by Paul J Lewis, Dr. Nicholas Flann, Mitchel R. Torrie, Eric A.Poulson, Thomas Petroff and Dr. Gary Witus; Date not after Sep. 18, 2008—actual date not known.

*Primary Examiner*—Christopher P Ellis
*Assistant Examiner*—Marlon A Arce
(74) *Attorney, Agent, or Firm*—Intellectual Property Law Offices of Joel Voelzke, APC

(57) ABSTRACT

A quad tracked vehicle may include a forward starboard track arm, an aft starboard track arm, a forward port track arm, and an aft port track arm. Forward track arms may be mounted for rotation about a vehicle body around axis of forward track arm by a forward coaxial transmission and motor, while aft tracks arms may be mounted for rotation about vehicle body around axis of aft extended coaxial transmission by an aft motor. Tracks may be mounted for rotation around track arms and rotate about minor axes. Forward tracks may rotate about forward major axis and aft tracks about aft major axis. Starboard tracks may be rotated by starboard motor, and port tracks by port motor.

7 Claims, 15 Drawing Sheets

U.S. PATENT DOCUMENTS

| | | | |
|---|---|---|---|
| 7,261,176 B2 * | 8/2007 | Chun et al. | 180/209 |
| 2002/0023788 A1 | 2/2002 | Torrie et al. | |
| 2004/0216932 A1 | 11/2004 | Givanetti et al. | |
| 2005/0072607 A1 | 4/2005 | Tucker | |

FOREIGN PATENT DOCUMENTS

| | | |
|---|---|---|
| JP | 63222982 | 9/1988 |
| JP | 04317876 | 11/1992 |

* cited by examiner

QUAD TRACKED VEHICLE

CROSS REFERENCE TO RELATED APPLICATIONS

This application claims the priority of U.S. Provisional application entitled "Quad Tracked Vehicle" Ser. No. 60/640,893, filed Dec. 31, 2004.

BACKGROUND OF THE INVENTION

1. Field of the Invention

This invention is related to vehicles and particularly to tracked vehicles for motion over difficult terrain.

2. Description of the Prior Art

Conventional tracked vehicles are limited in their abilities to drive over obstacles in their path.

What is needed is a vehicle configuration that provides enhanced abilities to drive over obstacles in its path.

DETAILED DISCLOSURE OF THE PREFERRED EMBODIMENT(S)

Figure 1:
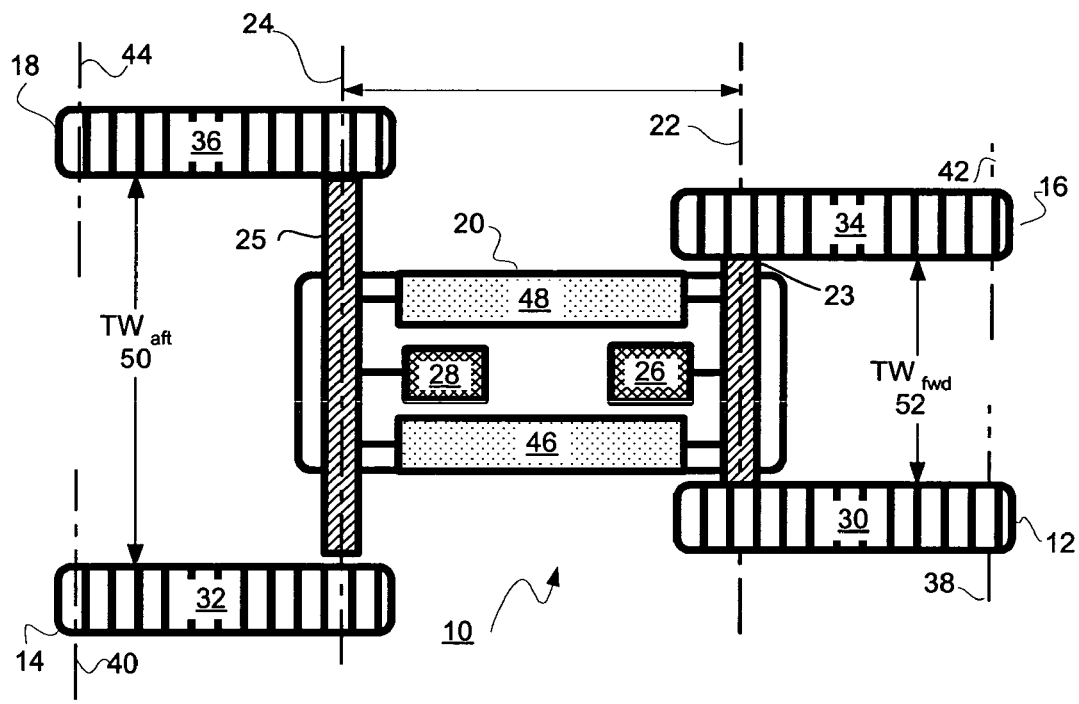
FIG. 1 is a top view of a quad tracked vehicle with its engine compartment open.

Referring now to FIG. 1, quad tracked vehicle 10 includes forward starboard track arm 12, aft starboard track arm 14, forward port track arm 16 and aft port track arm 18. Forward track arms 12 and 16 are mounted for rotation about vehicle body 20 around axis 22 of forward by forward coaxial transmission 23 by motor 26 while aft tracks arms 14 and 18 are mounted for rotation about vehicle body 20 around axis 24 of aft extended coaxial transmission 25 by aft motor 28. Tracks 30, 32, 34 and 36 are mounted for rotation around track arms 12, 14, 16 and 18 respectively, and rotate about minor axes 38, 40, 42 and 44 respectively. Forward tracks 30 and 34 rotate about forward major axis 22 and aft tracks 32 and 36 rotate about aft major axis 24. Starboard tracks are rotated by starboard motor 46 and port tracks are rotated by port motor 48.

The use of the terms forward, aft, port and starboard are for convenience. As described below, quad tracked vehicle 10 may move in either direction. Operation of starboard motor 46 in conjunction with port motor 48 in the same direction at the same speed causes tracked vehicle 10 to move forward or backward depending on the direction of rotation of the motors. Operation of motors 46 and 48 at different speeds causes quad tracked vehicle 10 to turn toward in the direction of the faster moving tracks. Operation of motors 46 and 48 in different directions causes tracked vehicle 10 to rotate. In these operations, tracked vehicle 10 operates in a manner similar to a two tracked vehicle.

Coaxial transmissions 23 and 25 may be two speed transmissions so that the tracks may be moved in the same direction at the same time at a high speed to propel vehicle 10 in a straight line at a high speed. Coaxial transmissions 23 and 25 may be manually or automatically shifted to a lower speed during turns, and/or while climbing obstacles, in order to reduce power requirements.

Figure 2:
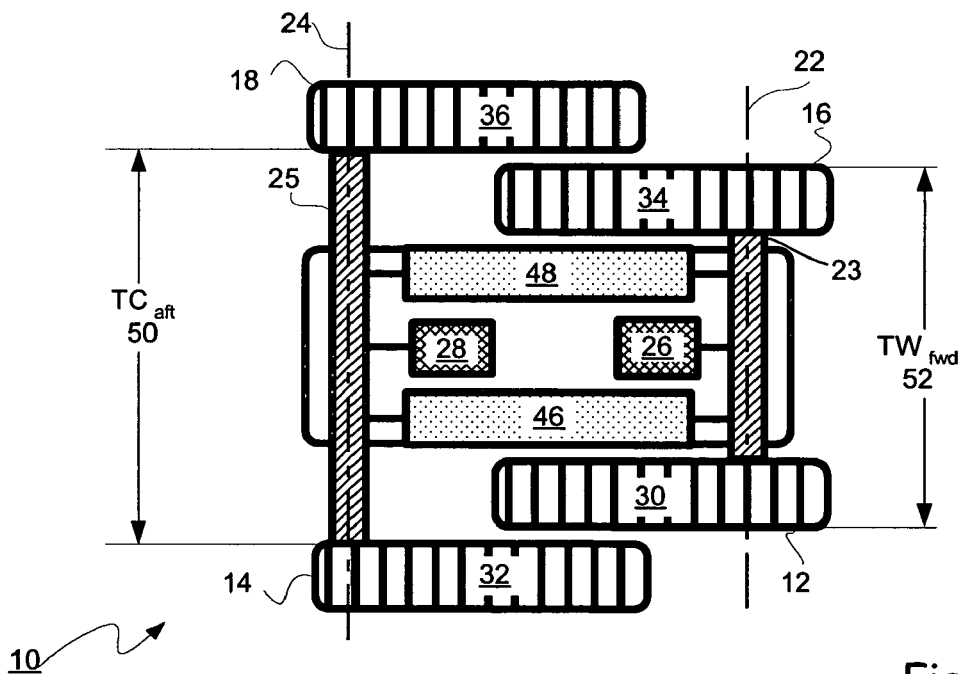
FIG. 2 is top view of the quad tracked vehicle of FIG. 1 with its track arms in a retracted configuration.

Referring now to FIG. 2, aft track clearance $TC_{aft}$ 50 between aft tracks 32 and 36 preferably wider than track width $TW_{fwd}$ 52 of forward tracks 30 and 34. Aft track arms 14 and 18 can then be rotated about axis 24 into a forward position at the same time that forward track arms 12 and 16 can be rotated about axis 22 into a rearward position. With the tracks in this retracted configuration, the overall length of tracked vehicle 10 is substantially shorter than the overall length of the vehicle in the extended configuration shown in FIG. 1. Preferably all track arms can rotate 360° about their respective axes. The distal end of each forward track arm 12 and 16 from its axis of rotation 22 is therefore preferably less than body length 54 between axes 22 and 24. In a preferred embodiment, the length of aft track arms 14 and 18 is the same as the length of forward track arms 12 and 16.

In the retracted configuration, the effect of the operation of the tracks may be slightly different. For example, when vehicle 10 is turning, the grip between the tracks and the ground may be different between the extended and retracted configurations because the angular change is different. The rate of angular change for each track in a particular turn in the retracted configuration is greater than the rate of angular change for these tracks in the extended configuration. This results in the tracks being required to skid more in a turn in the retracted configuration than they would be required to skid in a similar turn in the extended configuration.

Figure 3:
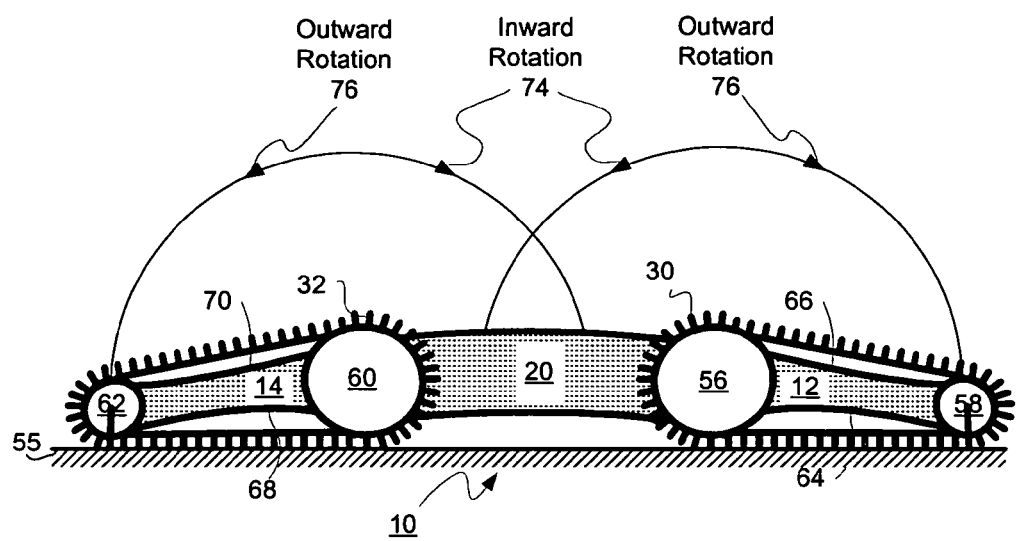
FIG. 3 is a side view of the quad tracked vehicle of FIG. 1 with its track arms in an extended configuration.

Referring now to FIG. 3, vehicle body 20 is supported on ground 55 by track arms 12, 14, 16 and 18 around which tracks 30, 32, 34 and 36 rotate. The port and starboard sides of vehicle 10 are generally the same, so for convenience of this disclosure only the starboard side will be described and the description is to be understood to apply to both the starboard and port sides. Track arms 12 and 14 are supported for rotation by axes 22 and 24, respectively. Track 30 is supported for rotation around track arm 12 by forward inboard wheel assembly 56, which is mounted for rotation about axis 22, and forward outboard wheel assembly 58, which is mounted for rotation about axis 38. Similarly track 32 is supported for rotation around track arm 14 by aft inboard wheel assembly 60, which is mounted for rotation about axis 24, and aft outboard wheel assembly 62, which is mounted for rotation about axis 40. The axes are shown in FIG. 1.

Each inboard wheel assembly 56 and 60 preferably has a larger diameter than its corresponding outboard wheel assembly 58 and 62. Each track arm 12 and 14 may fill the generally triangular shaped outline by tracks 30 and 32 to support these tracks. In a preferred embodiment as shown in the figure, elongate track support sides 64 and 66 of track arm 12 and elongate track support sides 68 and 70 of track arm 12 sides may both be somewhat concave to aid in driving over obstacles as will be described below in greater detail. Tracks 30 and 32 may be secured to track arms 12 and 14 solely by track supports along the periphery of wheel assemblies 56 and 58 and wheel assemblies 60 and 62 or also supported by elongate track support sides 64, 66, 68 and 70. If the elongate track support sides are concave as shown in the embodiment, capture mechanisms not shown in this figure are required to hold the tracks against the elongate track support sides.

Inboard wheel assemblies 56 and 60, in addition to rotating about axes 22 and 24 to propel tracks 30 and 32, preferably contain subassemblies permitting track arms 12 and 14 to be separately also rotated about these axes to change the angular orientation of the track arms with respect to body 20. One example of the rotation of track arms 12 and 14 about their axes can be seen from a comparison between FIGS. 1 and 2 which show track arms 12 and 14 rotated from an extended to a retracted configuration. FIG. 3 also illustrates an extended configuration of track arms 12 and 14.

For convenience, a convention has been developed to indicate the direction of rotation of the track arms. As noted above, track arm 12 rotates about axis 22 which is coaxial with forward inboard wheel assembly 56. Rotation of track arm 12 about axis 22, above ground 55, in a counterclockwise direction, from the extended configuration shown in FIGS. 1 and 3 to the retracted configuration shown in FIG. 2 may be referred to as in an above ground inward direction, or more simply, as an "inward" direction of rotation 72. Similarly, a clockwise rotation of track arm 14 about axis 24 in the center of aft inboard wheel assembly 60 may be referred to as in an inward direction 72 in that, while above ground 55, inward rotation moves the track arm from an extended to a retracted configuration. Rotation in the opposite direction above ground, from a generally extended configuration to a generally retracted configuration may be referred to as outward rotation 74.

It is important to note, that although the convention was described with regard to the starboard side of vehicle 10, the same convention applies with the same logic to the rotation of the track arms on the port side of vehicle 10. That is, rotation of each track arm above ground 55 from a retracted to an extended configuration may be referred to as outward rotation 76 while rotation in the opposite direction may be referred to as inward rotation 74. For simplicity, rotation of the track arms below the level of vehicle body 20, as shown for example in FIG. 4, will use the same convention. That is, rotation of the track arms in the inward direction will by this convention continue to be referred to as in the inward direction even after the rotation has passed the horizontal. Similarly, rotation in the same direction as outward rotation will continue to be referred to outward rotation even when the rotation is below the horizontal. The usefulness of this convention will become more apparent with regard to the description below of the manual and remote track and arm controls.

Figure 4:
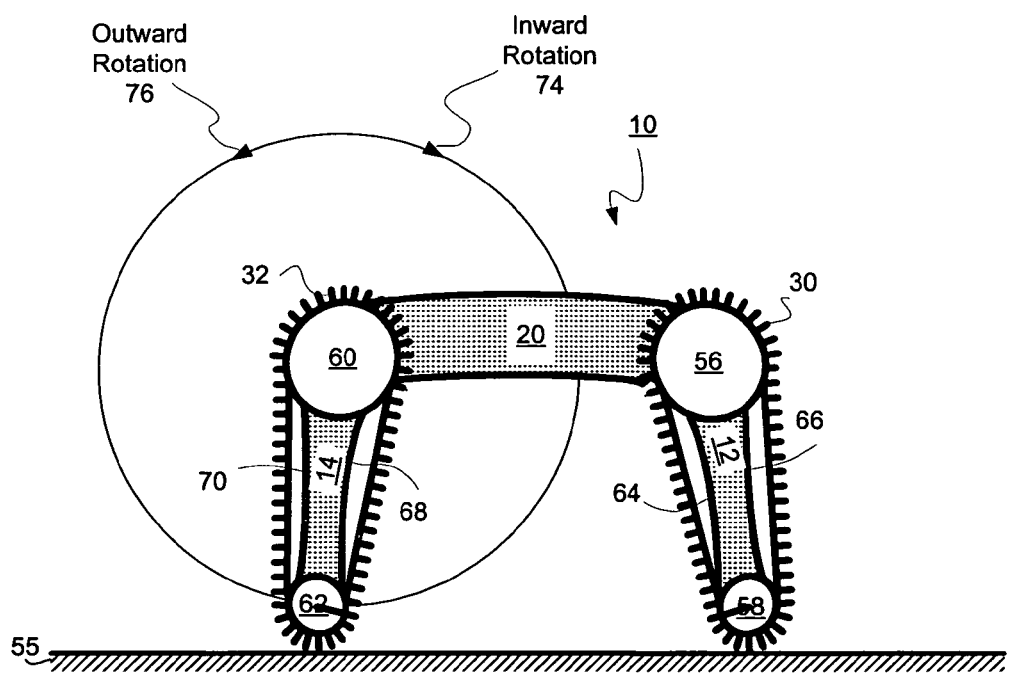
FIG. 4 is a side view of the quad tracked vehicle of FIG. 1 with its track arms in a vertically downward configuration.

Referring now to FIG. 4, track arms 12 and 14 have been rotated downward to a vertical or near vertical configuration so that the portion of tracks 30 and 32 supported by outboard wheel assemblies 58 and 62 are supporting the weight of vehicle 10 on ground 55. From the standpoint of the above described convention, the track arms may have been rotated in an outward direction from the retracted configuration through the extended track arm configuration, or from an intermediate position, to reach the vertically down configuration shown in FIG. 4. Alternately, the track arms could have been rotated from the extended through the retracted arm configuration, or from an intermediate position, to reach the configuration shown in FIG. 4. In a preferred embodiment, supporting vehicle 10 on its track arms extended vertically downward as shown, may provide greater ground clearance to traverse obstacles which fit between the tracks as well as greater speed and maneuverability.

Figure 5:
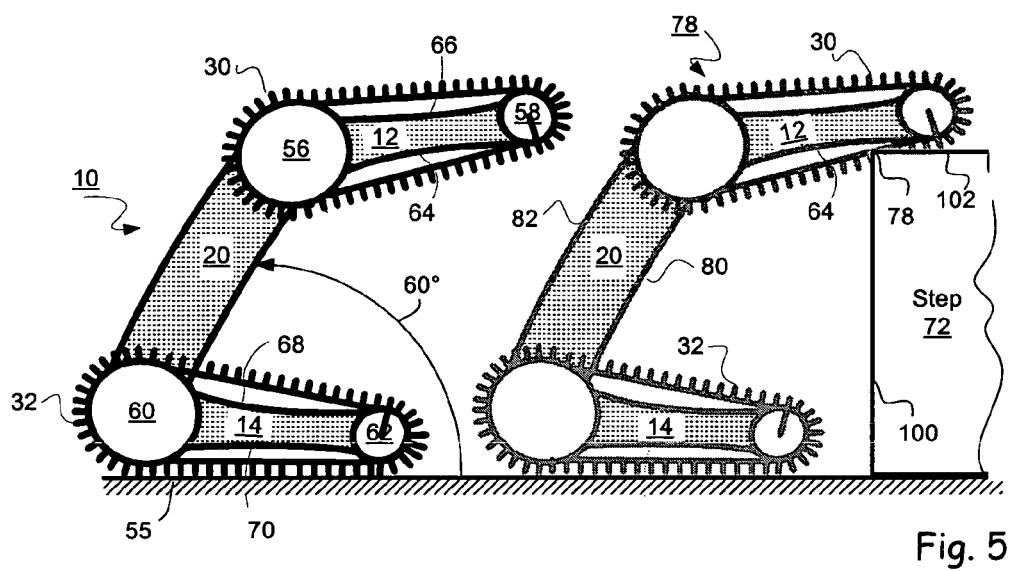
FIG. 5 is a side view of the quad track vehicle of FIG. 1 in an erect configuration for climbing obstacles, such as stairs.

Referring now to FIG. 5, vehicle 10 may be positioned in a generally erect configuration from many other configurations. Starting, for example, from the extended track arm configuration shown in FIG. 3, all four track arms 12, 14, 16 and 18 may be rotated in until the track arms are again horizontal so that vehicle 10 is in the retracted track arm configuration. Continued inward rotation of track arm 14, pushing against ground 55, will cause vehicle body 20 to be raised from a horizontal position to a more vertical position at, for example, an angle of about 60° as shown in FIG. 5. From an erect configuration, vehicle 10 may traverse over an obstacle, such as step 72, higher than its ground clearance as shown in FIG. 4.

In order to traverse or climb over step 72, forward track arms 12 and 16 may be rotated in a slightly forward direction as shown so that as vehicle 10 moves toward step 72 into vehicle position 78, forward tracks 30 and 34 contact the upper edge 78 of step 72. As discussed above with regard to FIG. 3, elongate side 64 may be straight or concave. In a preferred embodiment, elongate side 64 may be concave to provide a better sliding surface so that as vehicle 10 is continued to be moved toward step 72 from position 78, concave elongate side 64 may move into contact with the top of step 64. Similarly, lower surface 80 of vehicle body 20 may preferably be concave in order to enhance sliding contact with edge 78 of step 72. Further, as will be described below with regard to FIG. 6, upper surface 82 of vehicle 20 may preferably be convex to aid in flipping vehicle 10 from an upside down position into an upright position.

A combination of further forward motion of vehicle 10 propelled by forward motion of aft tracks 32 and 36 and forward tracks 30 and 34, coupled with an inward rotation of aft track arms 14 and 18, and/or outward rotation of track arms 12 and 16 may be used to permit vehicle 10 to climb and traverse step 72. It will be clear to a person skilled in this art that continued motions of the tracks and track arms will permit vehicle 10 to climb a series of steps following step 72.

Figure 6:
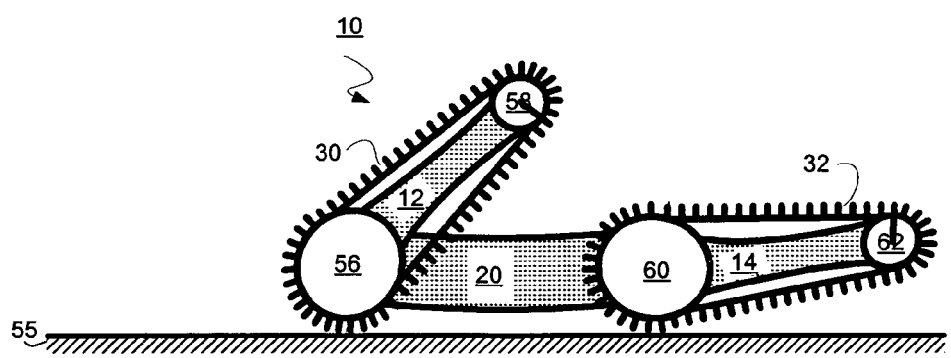
FIG. 6 is a side view of the quad track vehicle of FIG. 1 in an overturned configuration.
Figure 7:
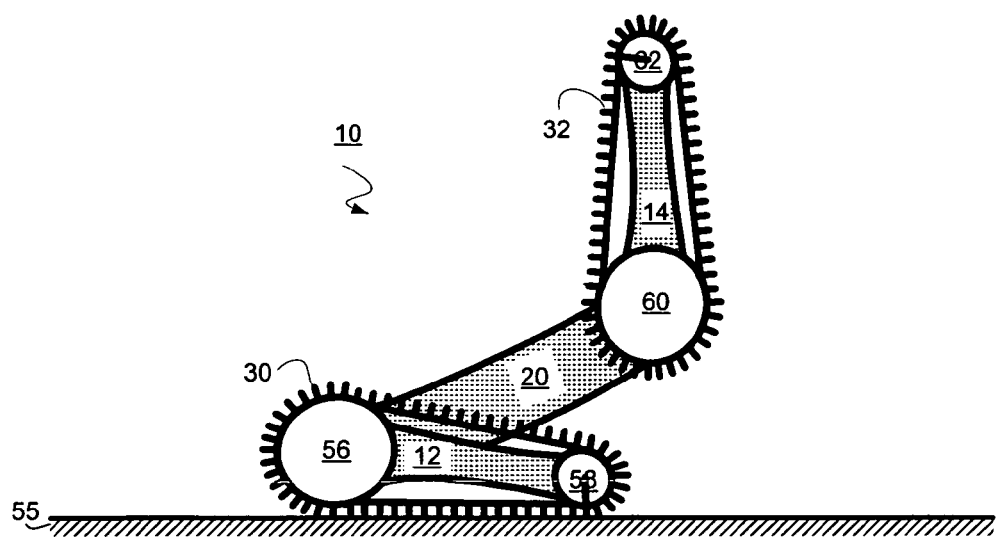
FIG. 7 is a side view of the quad track vehicle of FIG. 1 in an erect configuration after being overturned.

Referring now to FIGS. 6 and 7, during step climbing, the traversing of other obstacles, or as a result of overbalancing, vehicle 10 may be flipped over onto its back. To flip vehicle 10 back into an upright position, track arm 12 may be rotated in the outward direction, that is, in a clockwise fashion as shown in this figure, so that track arm 12 pushes against ground 55. Track arm 14 may also be rotated in the outward direction to bring the center of gravity of track arm 14 toward the center of vehicle body 20. Continued outward rotation of track arm 12 pushing against ground 55 will cause vehicle body 20, together with track arm 14, to rotate in a counter clockwise direction. Eventually vehicle 10 will be flipped back into an upright position with its track arms in a generally extended configuration.

Figure 8:
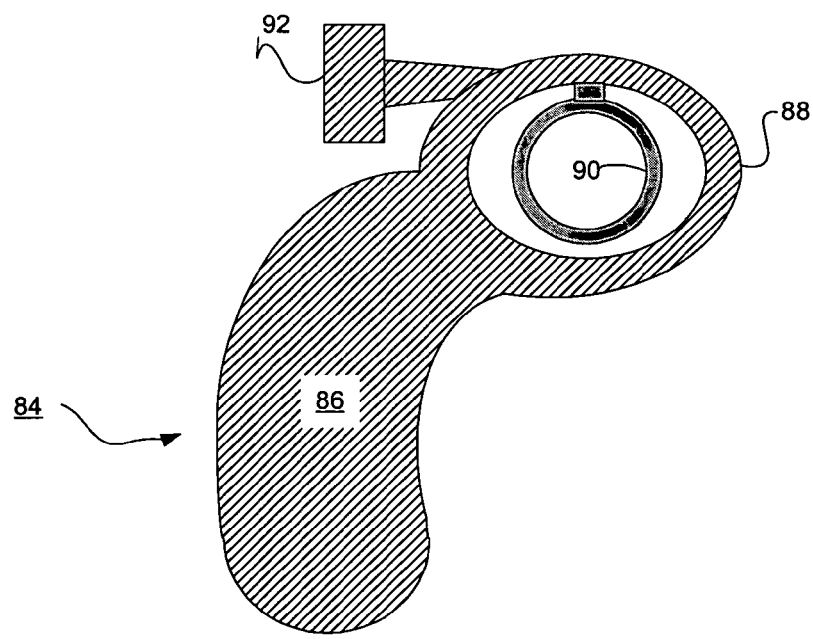
FIG. 8 is a side view of a remote control handle.

Referring now to FIG. 8, driving handle 84 includes hand grip portion 86 and finger guard portion 88. Finger ring control 90 is supported within finger guard 88 for forward and reverse finger motion actuation. Thumb actuated joystick 92 is also mounted to handle 84, preferably to finger guard 88. Driving handle 84 may be used as one half of a control apparatus for driving vehicle 10.

Figure 9:
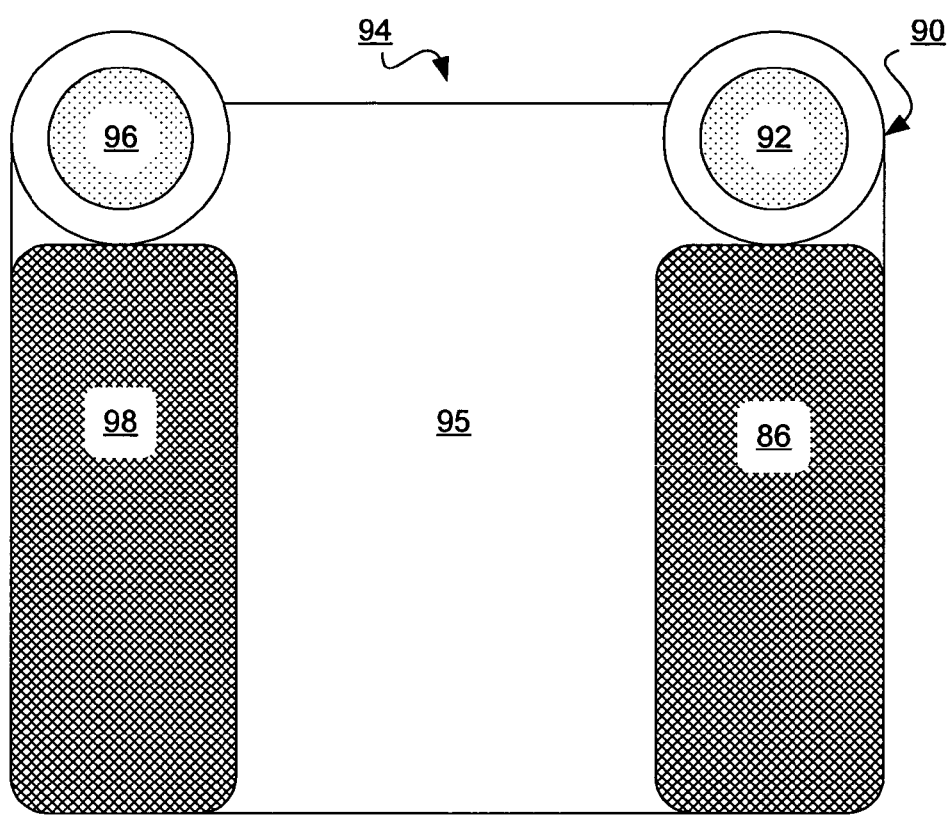
FIG. 9 is a front view of a remote control handle.

Referring now to FIG. 9, a pair of driving handles as shown on full control handles 94 may be used to control vehicle 10. Full control driving handles 94 includes body 95 on which palm grip 86 and thumb joystick 92 are mounted for operation by the driver's right hand and palm grip 98 and thumb joystick 96 are mounted for operation by the left hand. In a preferred embodiment, thumb joystick 92 controls the forward and backward motion of starboard tracks 30 and 32 while thumb joystick 96 controls the forward and backward motion of port tracks 34 and 36. Finger control ring 90, shown in FIG. 8, is mounted in front of thumb joystick 90 and may be used to control the rotation of forward track arms 12 and 16 while finger control ring 91, mounted in front of thumb joystick 96, may be used to control rotation of aft track arms 14 and 18.

The use of the convention for indicating the direction of rotation of the track arms, in which inward represents rotation in a direction toward the center of the vehicle when the track arms are above the horizon and outward represents rotation in a direction away from the center of the vehicle when the track arms are above the horizon, may be used with the finger control rings to control rotations of the forward and aft pairs of track arms. Alternately, the opposite convention may be used. The use, however, of a consistent connection between the direction for operation of the finger control rings and the direction of rotation of the track arm pairs with regard to the center of the vehicle body, is helpful in learning to drive the vehicle.

Full control driving handles 94 may be used with a multi-channel transmitter and receiver pair to control vehicle 10 remotely, for use as a toy or a remote unmanned observation or manipulation vehicle. In the later cases, the use of a wide angle video camera is preferred.

Figure 10:
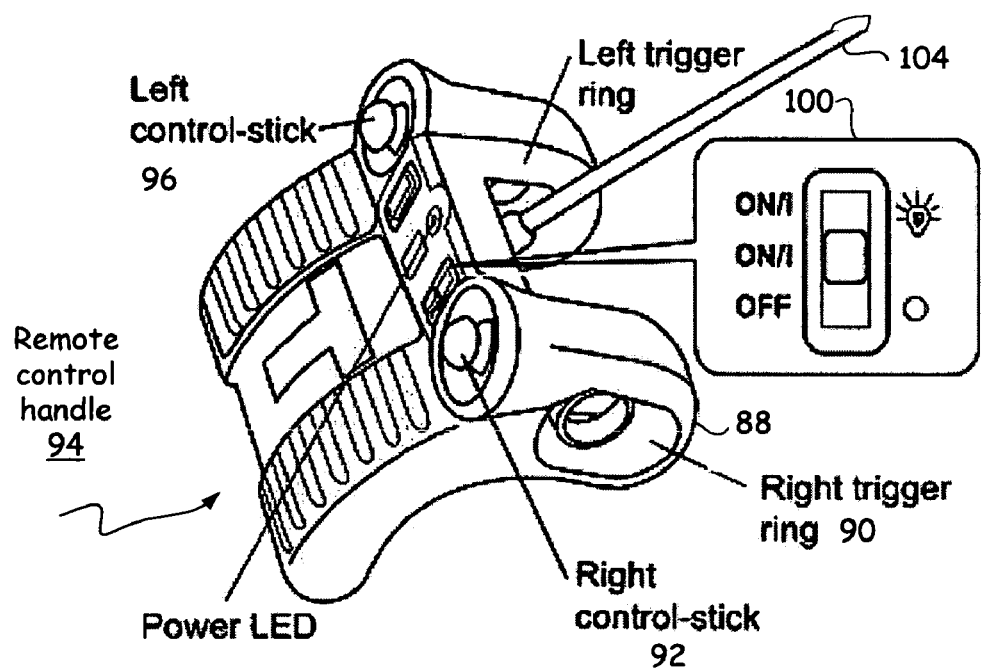
FIG. 10 is an isometric view of a remote control handle.

Referring now to FIG. 10, an isometric view of a preferred embodiment of remote control handle 94 is shown including left and right control joy sticks 96 and 92, left and right palm grips 98 and 86, right trigger guard 88 and right trigger ring 90. A corresponding left trigger ring is hidden from view in this figure. Switch panel 100 and power LED 102 are also shown together with antenna 104 which transmits control signals to a comparable antenna on vehicle 10.

Figure 11:
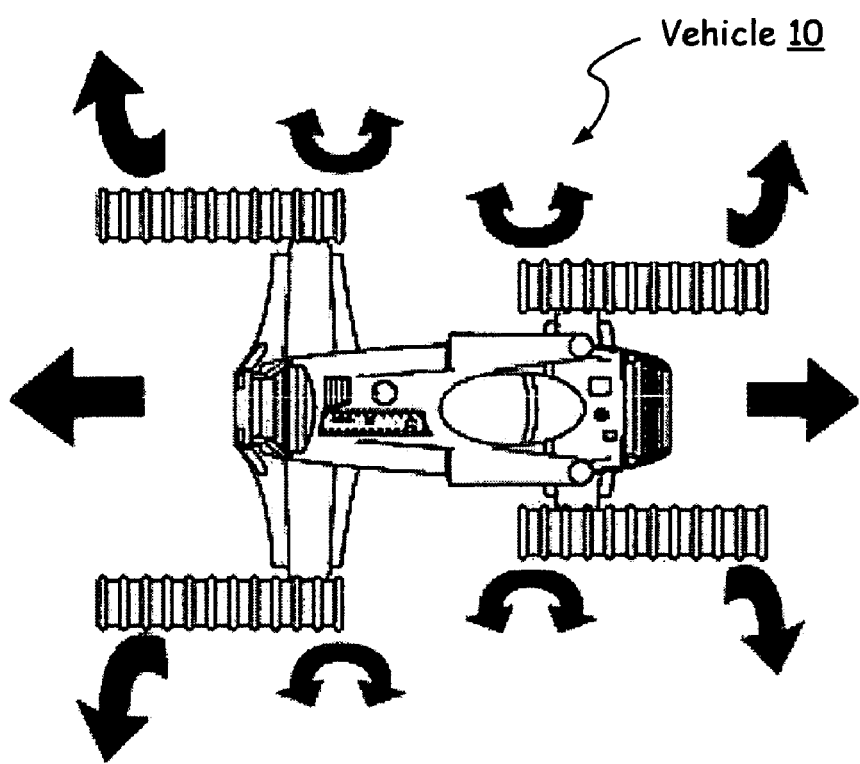
FIG. 11 is a top view of an embodiment of the vehicle.

Referring now to FIG. 11, a top view of a preferred embodiment of vehicle 10 is shown. The joy sticks control the forward, turning and backward motion of vehicle 10 while the left and right finger trigger rings control rotation of the front and rear track arms, respectively. Pulling both trigger rings inward unfolds the track arms, which will cause vehicle 10 to stand up as shown in FIG. 4, while pushing the trigger rings outward will cause the track arms to fold back.

Figure 12:
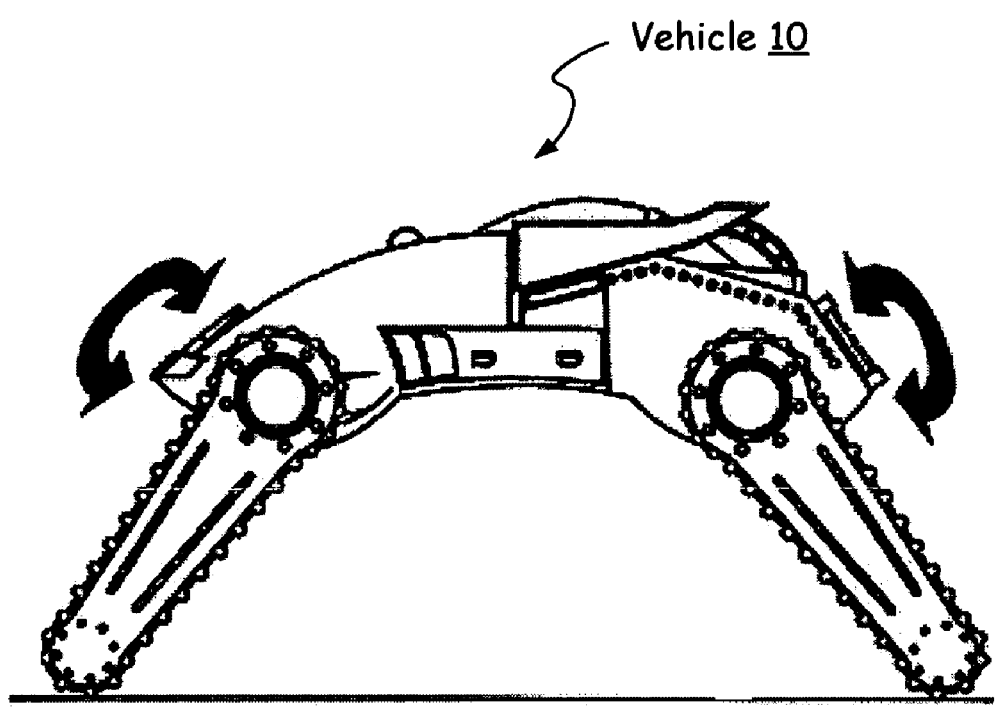
FIG. 12 is a side view of the vehicle of FIG. 11 in an upright configuration.

Referring now to FIG. 12, It may be advantageous to operate vehicle 10 in a configuration slightly inclined from the vertical to increase stability and steering.

Referring now to FIGS. 13-22, operation of vehicle 10 by remote or direct control to climb obstacles such as stairs requires practice and the development of related skills. There are many ways to perform such actions, and these techniques may be adjusted to the obstacles and related circumstances. A remotely controlled vehicle 10 may be conveniently be operated to climb a staircase, with for example an 11" tread and 7" riser, at a rate of about 3 seconds per step in a fast mode or about 5 seconds per step in a standard mode.

Figure 13:
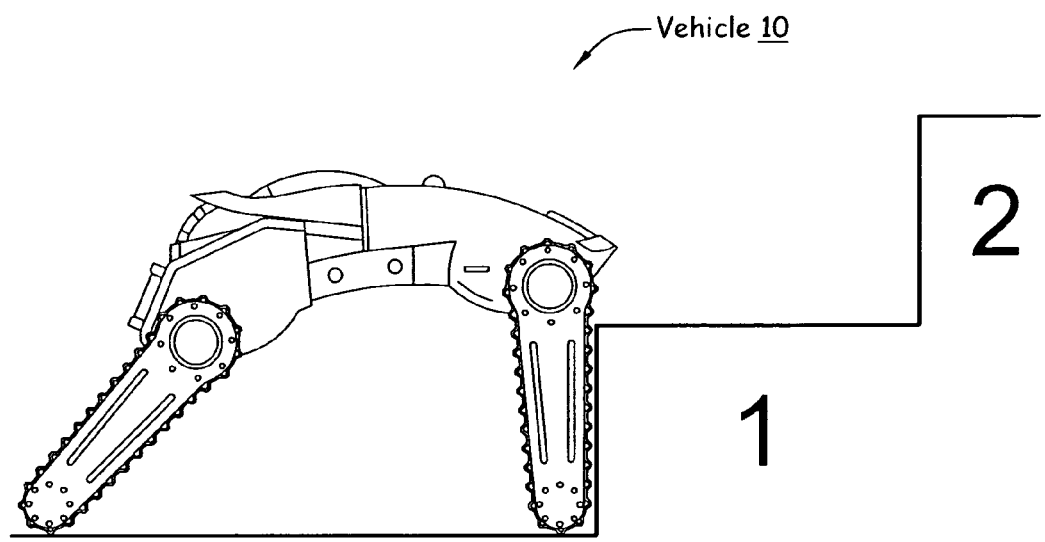
FIGS. 13-21 are side views of the vehicle of FIG. 11 climbing and descending steps.

Referring now to FIG. 13, to begin climbing a staircase, the rear arms may be unfolded to lift the rear of vehicle 10 while the vehicle is moved forward so that the front arms rest against the riser of the first step with the track grasping the edge of the first step as shown.

Figure 14:
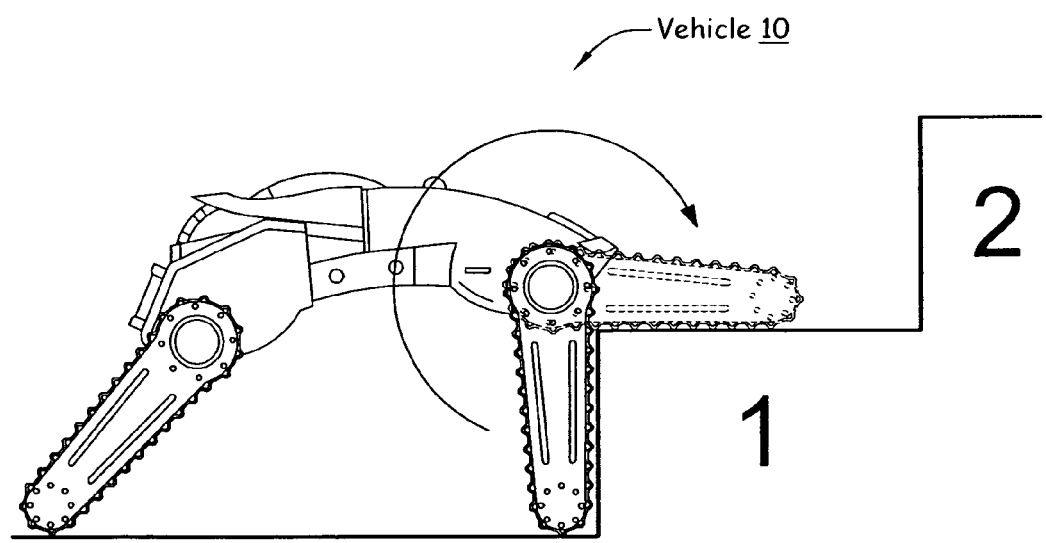

Referring now to FIG. 14, in the standard or in-phase climbing mode, the front arms may be swiveled upward 270° to contact the first stair tread by pulling inward on the left trigger ring while pushing the joysticks to move vehicle 10 forward.

Figure 15:
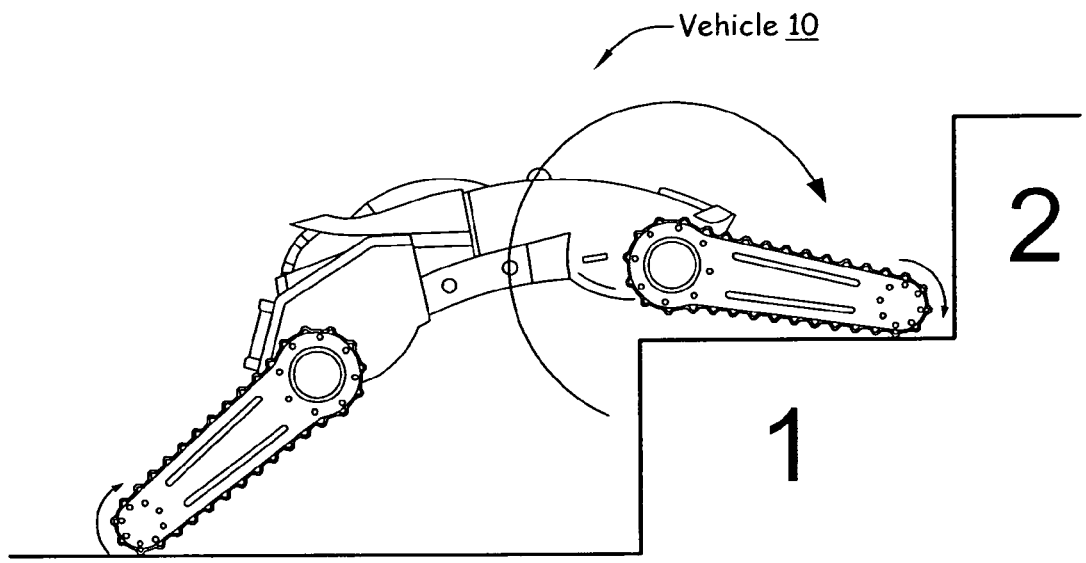
Figure 16:
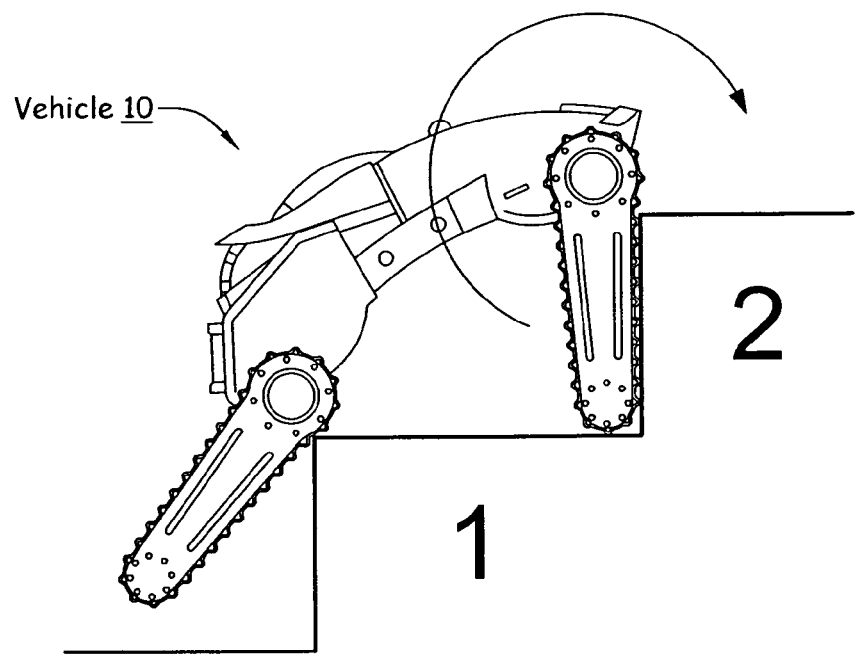

As shown in FIG. 15, once the front tracks are on the stair tread, continued rotation of the front track arms will cause vehicle 10 to begin to climb onto the first stair tread. As shown in FIG. 16, the forward motion and track arm rotation of vehicle 10 may be stopped when the front tracks are positioned vertically against the riser of the second step and the rear tracks are supporting vehicle 10 from the ground or by gripping the edge of the first step. The process may then be repeated for climbing the second stair by rotating the front arm onto the tread of the second step as shown.

Figure 17:
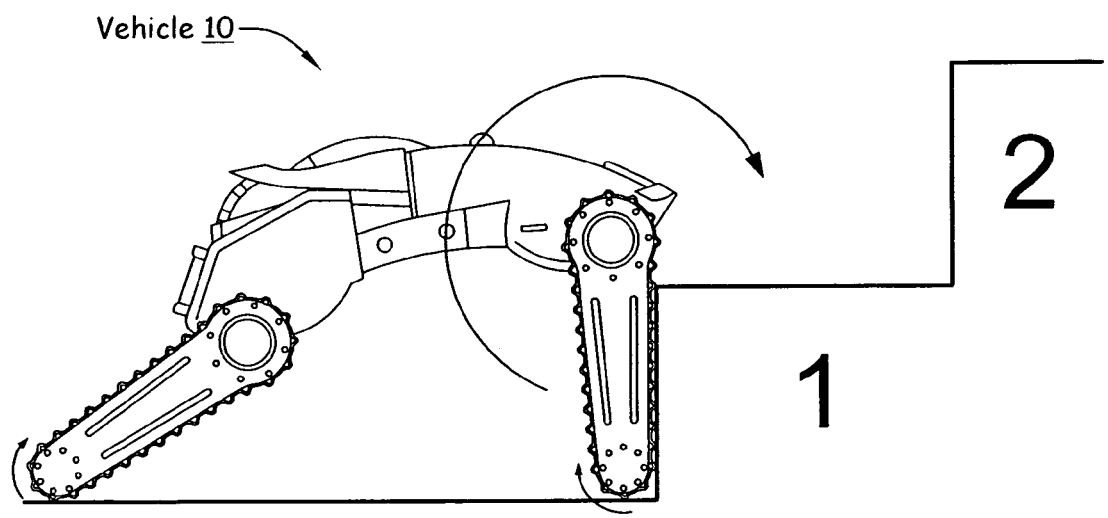
Figure 18:
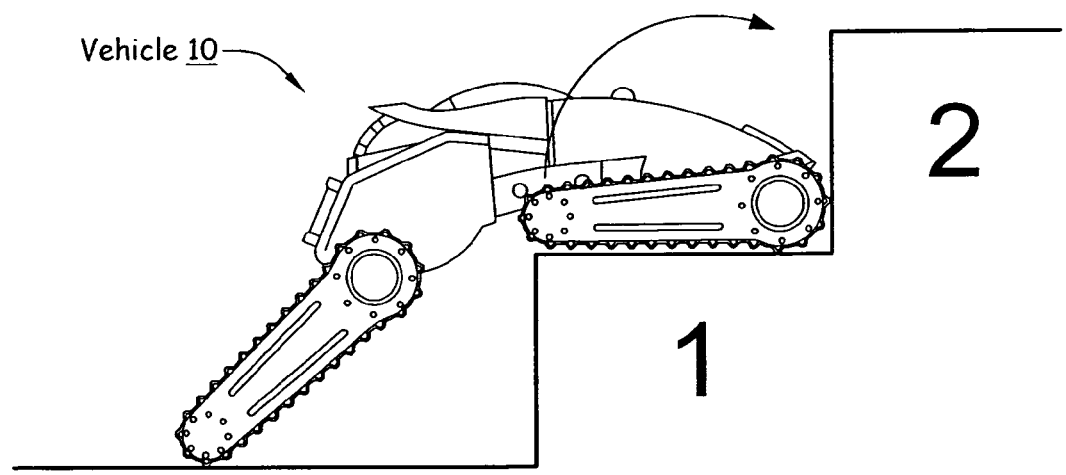
Figure 19:
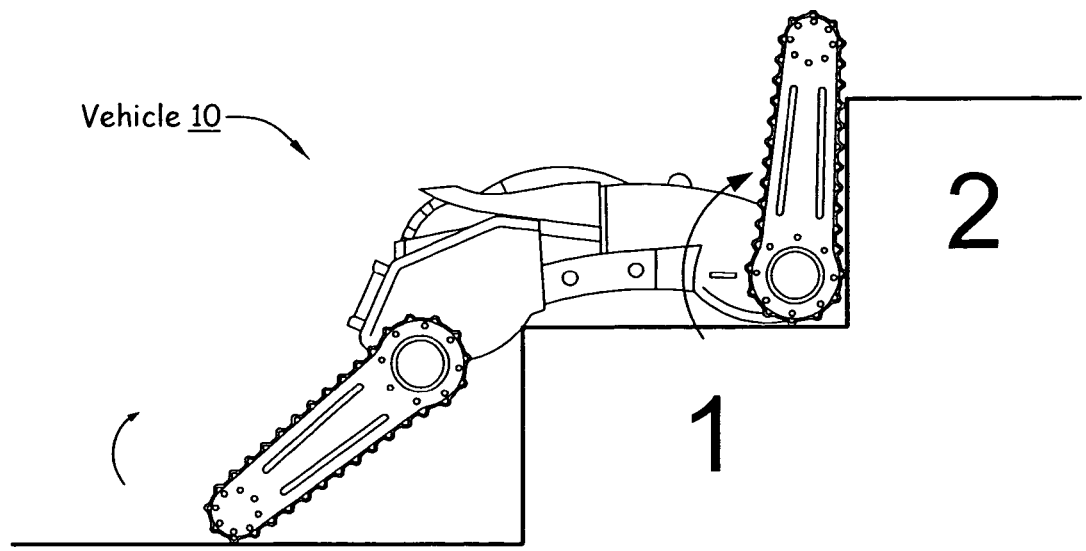
Figure 20:
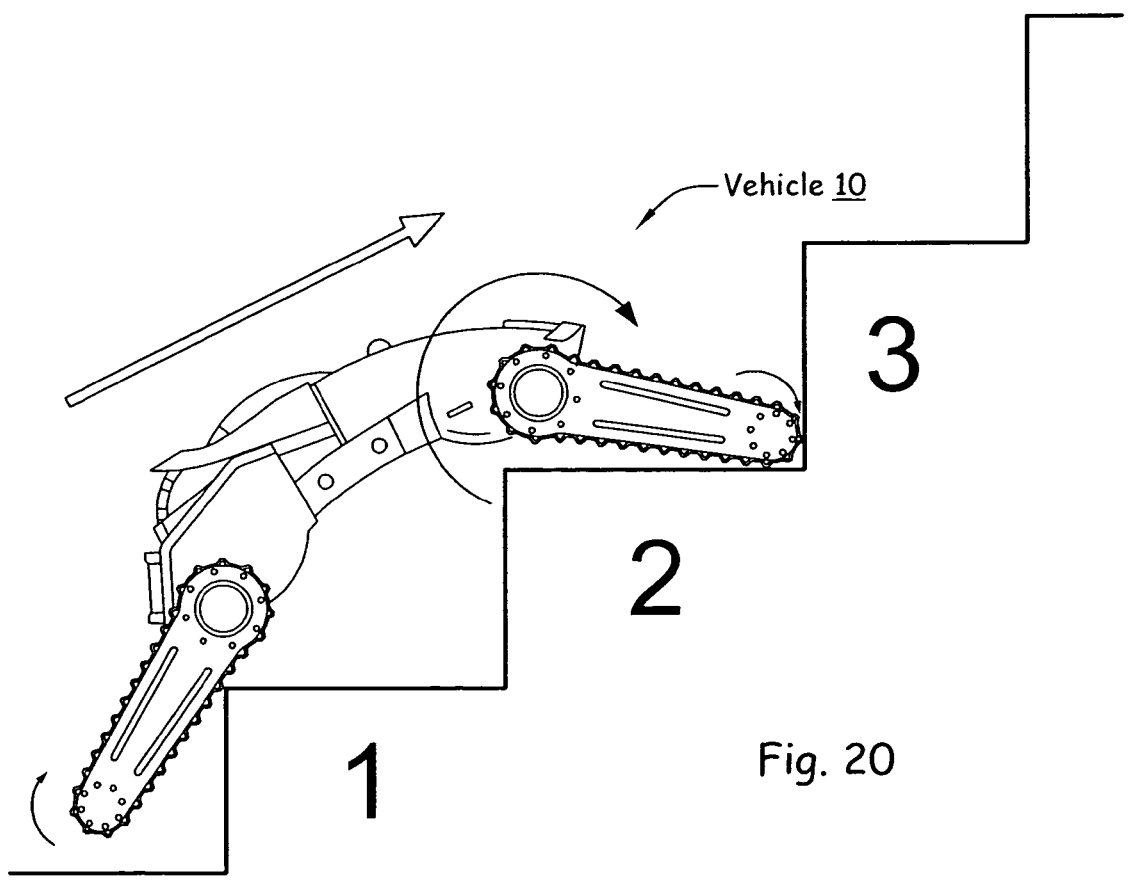

As shown in FIG. 17 a faster climbing operation may be achieved by beginning to swivel the forward arms up to the first stair tread while moving toward the steps. As shown in FIG. 18, the rotation of the forward track arms may be halted at a 90° angle rearward to increase the motion of vehicle 10 across the tread until contact with the riser of the next step is made. As shown in FIG. 19, the front arms may be swiveled with the treads moving forward until the treads catch on the edge of the second step. As shown in FIG. 20, continued forward motion and swiveling of the front arms will cause vehicle 10 to climb onto the tread of the second step. Repetition of these operations will permit the remaining stairs to be climbed.

Figure 21:
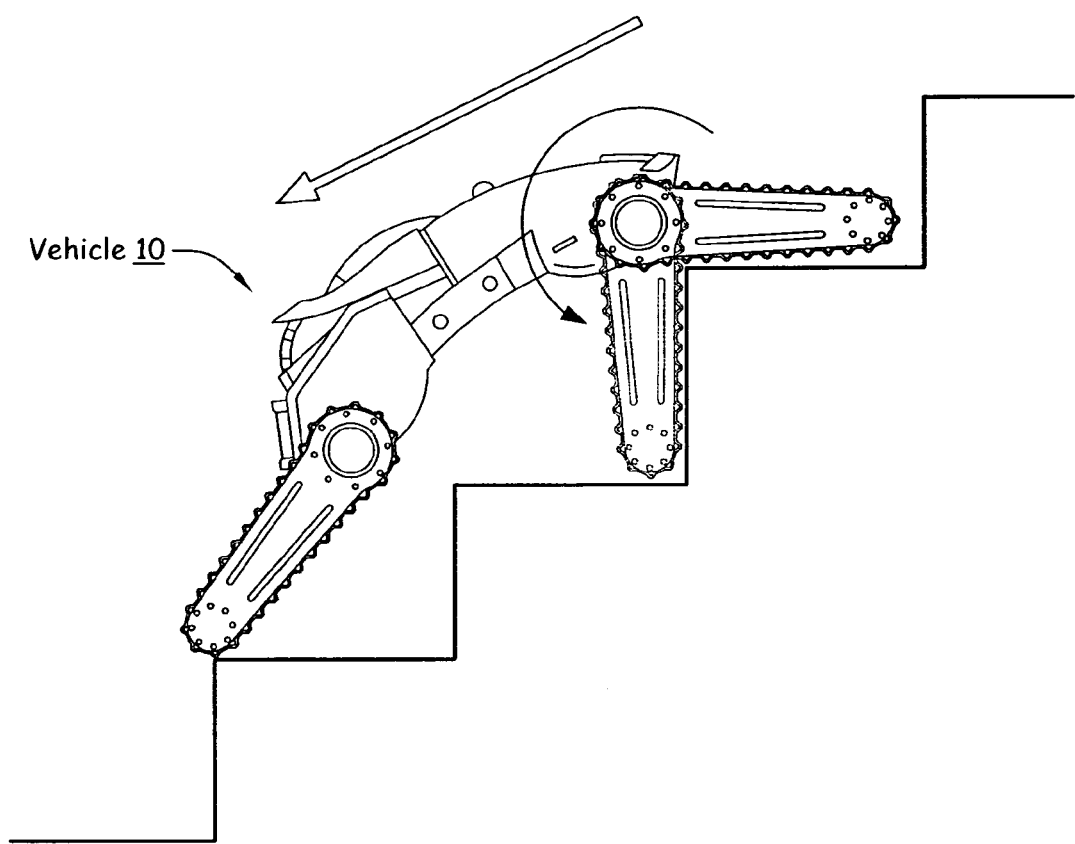

Referring now to FIG. 21, climbing down the steps of a staircase can be accomplished by rotating the front arms only, without motion of the treads. Alternatively, the front arms may be positioned in an outstretched manner, similar to the rear arms or with both arms fully outstretched, so that vehicle 10 can descend the staircase by running along the down slope of the edges of the stair treads.

It should be noted that vehicle 10 can be operated in either direction, so that it may be operated to climb the steps in reverse. In fact, vehicle 10 may be operated in many different modes for the same or different purposes. Similarly, vehicle 10 may be operated to move forward and backward only on one set of treads. For example, the rear treads may be rotated to a position flat with the floor or ground, the front arms folded in and then the rear arms rotated to lift the front of the vehicle in a configuration reminiscent of a dog sitting on its hind legs and begging.

The speed of the rotation of the arms for swiveling may be matched to the obstacles encountered. For example, in the above described in-phase stair climbing operation, it may be convenient for the speed of arm swiveling to match the climbing speed so that the arms are in the appropriate swiveled position to pull the vehicle up the next step and avoid slippage.

The physical size of the vehicle may be selected for the obstacles to be encountered. For example, for stair climbing, it is advantageous for the distance between the axes of rotation of the arms to permit the vehicle to sit on two consecutive steps. The treads of each track may advantageously be transverse to the direction of motion for better gripping of stair edges and other obstacles.

Figure 22:
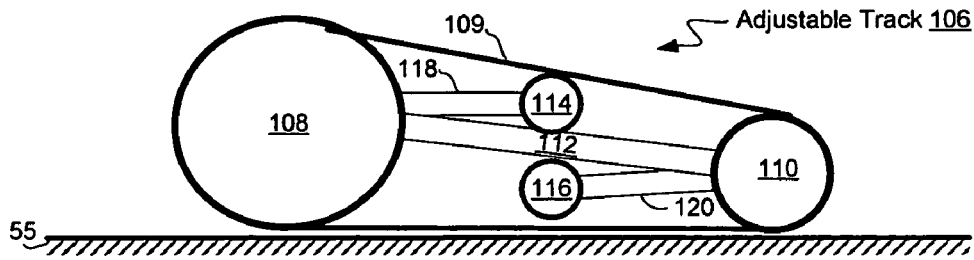
FIG. 22 is a side view of an adjustable track length track arm in a full length configuration.

Referring now to FIG. 22, adjustable length track 106 is shown in an extended configuration in which the length of track arm 112 has been maximized to maximize the distance between wheel assemblies 108 and 110 to maximize the portion of track 109 which rests on ground 55. Adjustable track 106 includes idle wheel assemblies 114 and 116 mounted for rotation at the end of idle arms 118 and 120, respectively. It may be advantageous to mount idle arms 118 and 120 in this configuration so that idle wheel assemblies 114 and 116 are not in contact with continuous track 109 so that the portions of track 109 extending between wheel assemblies 108 and 110 are relatively straight and not curved.

Figure 23:
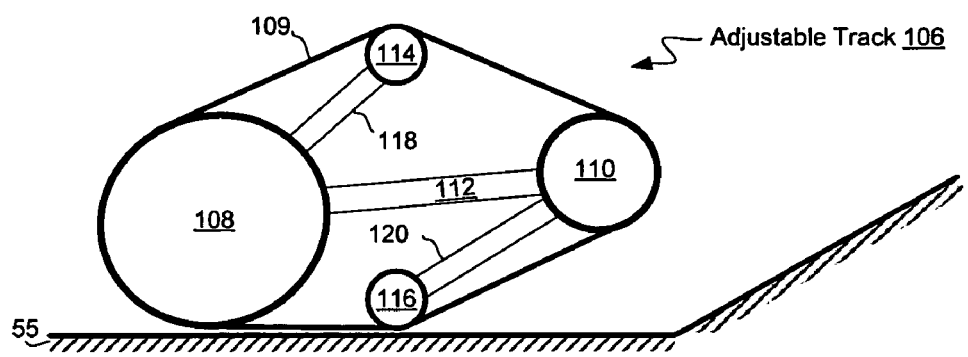
FIG. 23 is a side view of the adjustable track length track arm of FIG. 22 in a reduced length configuration.

Referring now to FIG. 23, adjustable track 106 is shown in a shortened configuration in which the length of track arm 112 has been minimized to minimize the distance between wheel assemblies 108 and 110 to minimize the portion of track 109 which rests on ground 55. A reduction in the length of track 109 on ground 55 may be desirable in when the size and distance between obstacles on ground 55 results in a smoother less jarring motion. In addition, the slope of the portion of track 109 between wheel assembly 110 and idle wheel assembly 116 may be adjusted this way in order to permit vehicle 10 to more conveniently handle changes in the slope of ground 55.

Idle arms 118 and 120 may be mounted for rotation about the axes of rotation of wheel assemblies 110 and 108 respectively. Idle arms 118 and 120 may be rotated from the extended configuration shown in FIG. 22 to the shortened configuration shown in FIG. 23, and to any intermediate configuration, by conventional mechanical means such as a clutch to engage a suitable source of power, such as the sources of power driving wheels assemblies 108 and 110. Idle arms 118 and 120 may be locked into position by a braking or other locking mechanism. The use of rotatable idle wheel assemblies 114 and 116 mounted for rotation on rotatable idle arm assemblies 118 and 120, together with adjustable length track arm 112 permit the change in length of track arm 112 to be accomplished without changing the length of track 109.

In an alternate embodiment, adjustable length track arm 112 may be used without idle wheels 114 and 116 as long as track 109 is sufficiently elastic to accommodate the resultant changes in track length.

Figure 24:
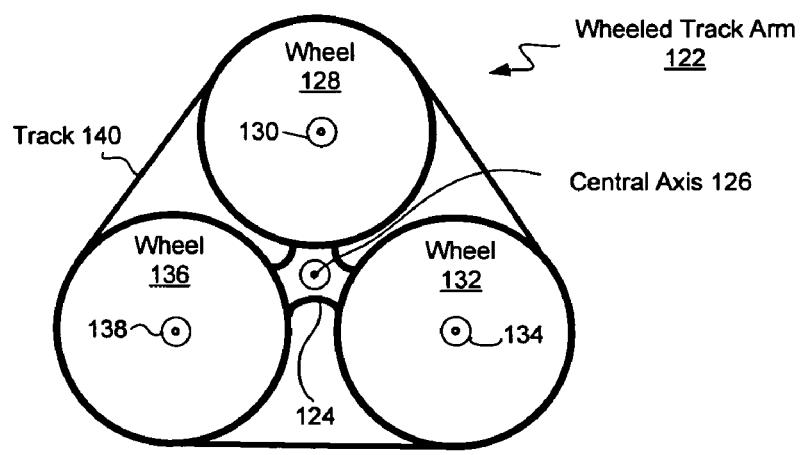
FIG. 24 is a side view of a wheeled track arm.

Referring now to FIG. 24, in alternate embodiments, one or more track arms may be replaced with wheeled track arm 122 which includes central arm 124 mounted for rotation about central axis 126, and wheel assemblies 128, 132 and 136 mounted for rotation about wheel axes 130, 134 and 138 respectively. Track 140 may optionally be used around track arm 122.

Figure 25:
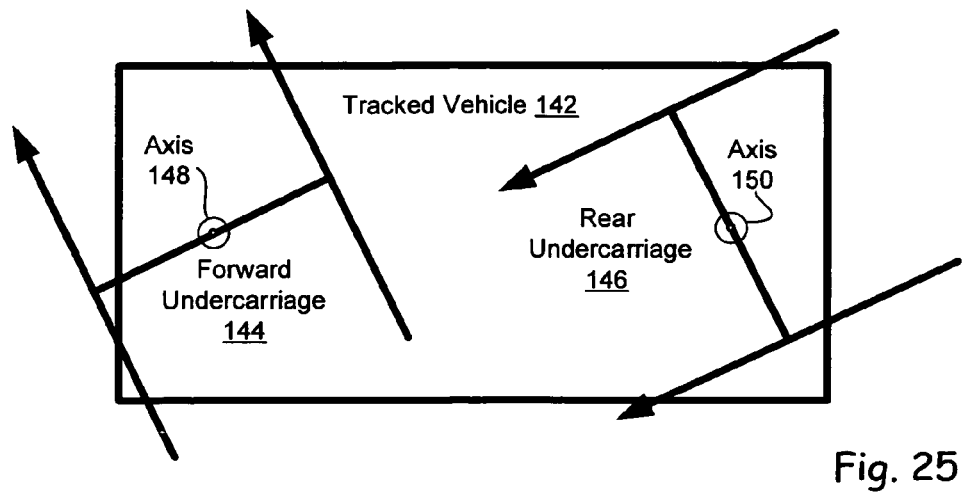
FIG. 25 is a schematic top view of a tracked vehicle with undercarriages.

Referring now to FIG. 25, a schematic top view of tracked vehicle 142 is shown including undercarriage 144 rotating about axis 148 and undercarriage 246 rotating about axis 150. The use of undercarriages mounted for rotation about axes permits tracked vehicle 142 to turn in tight spaces.

Figure 26:
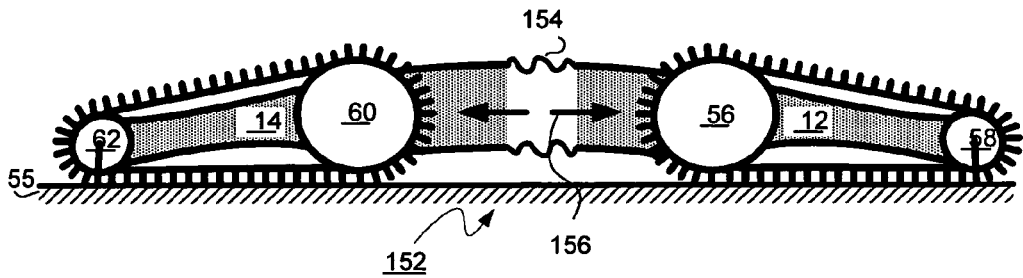
FIG. 26 is a side view of a tracked vehicle with an accordion body portion which permits the wheel base of the vehicle to be shortened or lengthened.

Referring now to FIG. 26, central adjustment 156 permits accordion portion of tracked vehicle 152 to be shortened or lengthened to change the wheelbase of tracked vehicle 152.

Figure 27:
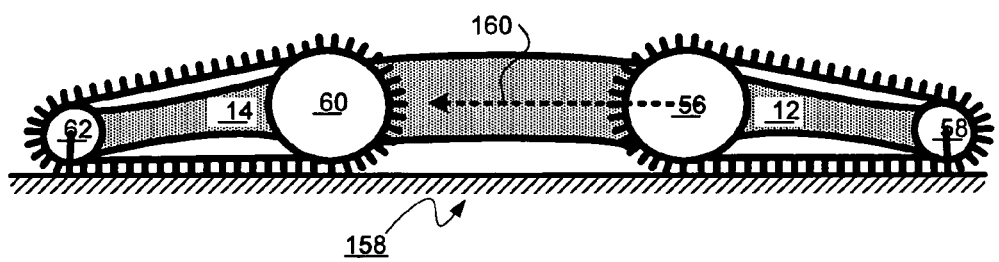
FIG. 27 is a side view of a tracked vehicle in which the axis of a pair of track arms can be moved for an aft.

Referring now to FIGS. 1, 2 and 27, tracked vehicle 158 include a pair of after track arms, one of which, track arm 12, is visible in this figure. The pair of track arms including track arm 12 may be moved along line 160 to change the distance between the pairs of track arms.

The invention claimed is:

1. A vehicle comprising:
a vehicle body having a first axis near a first end of the body and a second axis near a second end of the body;
a first pair of track arms mounted for rotation about the first axis, wherein a length of the first pair of track arms is adjustable with a first range;
a first pair of tracks each mounted for rotation about one of the first pair of track arms, wherein the first pair of tracks is sufficiently elastic to compensate for adjustments of the length of the first pair of track arms within the first range;
a second pair of track arms mounted for rotation about the second axis, each of the second pair of track arms extending from the second axis more than half the distance to the first axis and rotatable through a point of rotation nearest to the first axis;
a second pair of tracks each mounted for rotation about one of the second pair of track arms; and
a control system selectively rotating the first and second pairs of tracks to move and turn the vehicle in forward and reverse directions and selectively rotating the first and second pairs of track arms about the first and second axes respectively.

2. The vehicle of claim 1 wherein the body has a concave lower body surface nearest the terrain to slide over edges of obstacles.

3. The vehicle claim 1 wherein each track arm has a concave lower surface to slide over edges of obstacles.

4. The vehicle of claim 1 wherein each of the first pair of track arms further comprises:
a first wheel rotatable about the first axis;
a second wheel;
an adjustable length arm mounted adjacent the first wheel and supporting the second wheel for rotation about another axis; and
an additional wheel adjustably mounted for maintaining support for the track at different lengths of the track arm.

5. A vehicle comprising:
a vehicle body having a first end and a second end;
first axle attached to said vehicle body toward said first end;
a second axle attached to said vehicle body toward said second end;
a first pair of track arms mounted for rotation about said first axle; and
a second pair of track arms mounted for rotation about said second axle, wherein said first axle is sufficiently shorter than said second axle such that the arc created by a 360 degree rotation of said first pair of track arms may overlap the arc created by a 360 degree rotation of said second pair of track arms without the first pair of track arms coming into contact with the second pair of track arms;
wherein the length of each track arm is adjustable.

6. The vehicle of claim 5 wherein said vehicle body has a concave surface nearest the terrain to slide over edges of obstacles.

7. A vehicle comprising:
a vehicle body having a first end and a second end;
a first axle attached to said vehicle body toward said first end;
a second axle attached to said vehicle body toward said second end;
a first pair of track arms mounted for rotation about said first axle; and
a second pair of track arms mounted for rotation about said second axle, wherein said first axle is sufficiently shorter than said second axle such that the arc created by a 360 degree rotation of said first pair of track arms may overlap the arc created by a 360 degree rotation of said second pair of track arms without the first pair of track arms coming into contact with the second pair of track arms;
a control system for selectively rotating said first and second pairs of track arms about said first and second axles and selectively rotating said track about said first and second pairs of track arms so as to move and turn the vehicle in forward and reverse directions;

wherein each track track arm further comprises a track mounted for rotation about the track arm; and wherein said control system is further operable to climb an obstacle by:

rotating said first and second pairs of track arms below a horizontal level to raise said vehicle body above the terrain;

rotating said track about said first and second pairs of track arms to move said vehicle to contact said obstacle;

further rotating the pair of track arms closest said obstacle; and further rotating said track about said first and second pairs of track arms to climb said obstacle.

* * * * *

UNITED STATES PATENT AND TRADEMARK OFFICE
CERTIFICATE OF CORRECTION

PATENT NO. : 7,581,605 B2
APPLICATION NO. : 11/360458
DATED : September 1, 2009
INVENTOR(S) : Yuval Caspi It is certified that error appears in the above-identified patent and that said Letters Patent is hereby corrected as shown below:

In claim 3, column 8, line 19, after "vehicle" insert -- of --.

In claim 5, column 8, line 32, insert -- a -- before "first axle".

In claim 7, column 9, line 3, after "track" delete "track".

Signed and Sealed this

Thirteenth Day of October, 2009

David J. Kappos
*Director of the United States Patent and Trademark Office*